(12) United States Patent
Yao et al.

(10) Patent No.: US 12,113,737 B2
(45) Date of Patent: *Oct. 8, 2024

(54) TECHNOLOGIES FOR NR COVERAGE ENHANCEMENT

(71) Applicant: Apple Inc., Cupertino, CA (US)

(72) Inventors: Chunhai Yao, Beijing (CN); Chunxuan Ye, Beijing (CN); Dawei Zhang, Cupertino, CA (US); Fangli Xu, Cupertino, CA (US); Haijing Hu, Cupertino, CA (US); Haitong Sun, Cupertino, CA (US); Hong He, Cupertino, CA (US); Jie Cui, Cupertino, CA (US); Oghenekome Oteri, Cupertino, CA (US); Shu Guo, Cupertino, CA (US); Wei Zeng, Cupertino, CA (US); Weidong Yang, Cupertino, CA (US); Yang Tang, Cupertino, CA (US); Yuchul Kim, Cupertino, CA (US); Yuqin Chen, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/598,217

(22) PCT Filed: May 14, 2020

(86) PCT No.: PCT/CN2020/090229
§ 371 (c)(1),
(2) Date: Sep. 24, 2021

(87) PCT Pub. No.: WO2021/226929
PCT Pub. Date: Nov. 18, 2021

(65) Prior Publication Data
US 2023/0058265 A1  Feb. 23, 2023

(51) Int. Cl.
H04L 5/00 (2006.01)
H04W 72/0453 (2023.01)
H04W 72/23 (2023.01)

(52) U.S. Cl.
CPC ....... H04L 5/0048 (2013.01); H04W 72/0453 (2013.01); H04W 72/23 (2023.01)

(58) Field of Classification Search
CPC ..... H04L 5/0048; H04L 1/1896; H04L 1/189; H04L 1/1893; H04L 72/0833;
(Continued)

(56) References Cited

U.S. PATENT DOCUMENTS

2015/0043445 A1  2/2015 Xiong et al.
2020/0141887 A1*  5/2020 Kampfl ............... G01N 5/025
(Continued)

FOREIGN PATENT DOCUMENTS

EP     3684123 A1   7/2020
WO     2015/021315 A1   2/2015
WO     WO-2019050381 A1 *  3/2019 ........... H04L 1/0006

OTHER PUBLICATIONS

Huawei et al., "Remaining NB-IoT random access physical layer aspects" France, Feb. 14, 2016 (Year: 2016).*
(Continued)

*Primary Examiner* — Mewale A Ambaye
(74) *Attorney, Agent, or Firm* — Womble Bond Dickinson (US) LLP

(57) ABSTRACT

Methods to enhance the coverage of NR systems for coverage-limited wireless devices are disclosed. A serving base station may configure a coverage-limited UE with parameters for the UE to operate in a coverage enhancement mode through RRC signaling, DCI, or RAR grant. The UE may use the configuration parameters to determine whether to enter into the coverage enhancement mode when connecting
(Continued)

and communicating with the serving base station. The configuration parameters may configure the UE to exploit both time diversity and frequency diversity to extend and enhance coverage when receiving the PDSCH and PDCCH channels, when transmitting the PUSCH and PUCCH channel, and when transmitting PUSCH Msg3 during random access. Advantageously, the base station may flexibly and dynamically configure the UE with coverage enhancement parameters to extend the coverage of the UE using time diversity and frequency diversity gains as the UE moves around.

20 Claims, 10 Drawing Sheets

(58) Field of Classification Search
CPC ............. H04W 72/23; H04W 72/0453; H04W 72/046; H04W 72/21
See application file for complete search history.

(56) References Cited

U.S. PATENT DOCUMENTS

| | | | |
|---|---|---|---|
| 2020/0146058 A1* | 5/2020 | Xu | H04W 72/0453 |
| 2021/0297999 A1* | 9/2021 | Kim | H04W 72/23 |
| 2022/0123885 A1* | 4/2022 | Shin | H04W 74/0833 |
| 2022/0210679 A1* | 6/2022 | Cirik | H04L 5/001 |
| 2022/0225360 A1 | 7/2022 | Yi et al. | |
| 2022/0225362 A1* | 7/2022 | Yi | H04W 72/046 |
| 2022/0346093 A1 | 10/2022 | Choi et al. | |
| 2023/0028762 A1 | 1/2023 | Choi et al. | |
| 2023/0291523 A1 | 9/2023 | Hasegawa et al. | |

OTHER PUBLICATIONS

European Search Report and Search Opinion received for European Application No. 23200033.1, mailed on Jan. 22, 2024, 8 pages.
International Preliminary Report on Patentability received for PCT Patent Application No. PCT/CN2020/090229, mailed on Nov. 24, 2022, 5 pages.
International Search Report and Written Opinion received for PCT Patent Application No. PCT/CN2020/090229, mailed on Jan. 28, 2021, 6 pages.
Non-Final Office Action received for U.S. Appl. No. 17/958,016, mailed on Jan. 16, 2024, 11 pages.
Qualcomm Incorporated. "Coverage enhancement techniques" 3GPP TSG-RAN WGJ #86 R1-166319, Aug. 26, 2016, 2 pages.
Supplementary European Search Report and Search Opinion received for European Application No. 20935569.2, mailed on Jan. 5, 2024, 7 pages.
ZTE, "Detailed design on PDSCH for MTC enhancement" 3GPP TSG RAN WGJ Meeting #81 R1-152957, May 29, 2015, 3 pages.
Notice of Allowance received for U.S. Appl. No. 17/958,016, mailed on Jul. 10, 2024, 9 pages.

* cited by examiner

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| PUSCH repetition number | 2 |
| MCS table indication | 1 |
| Inter-slot frequency hopping | 1 |
| Repetition number for each hop | 2 |

FIG. 7

TECHNOLOGIES FOR NR COVERAGE ENHANCEMENT

FIELD

This disclosure relates to the field of wireless communication, and more specifically, to methods that enable wireless communication devices to extend their communication range or coverage. Other aspects are also described.

BACKGROUND

As the number of mobile devices connected to wireless networks and the demand for mobile data traffic continue to increase, changes are made to system requirements and architectures to meet the burgeoning demand. For example, wireless communication networks such as the 5G new radio (NR) systems and 4G Long Term Evolution (LTE) may need to extend the communication range or coverage. One recent coverage enhancement targets rural deployment of the NR networks operating in frequency range FR1 where wireless devices are located at extremely long distance away from a serving base station. Other coverage enhancements include urban deployment of the NR networks in which outdoor base stations serve indoor wireless devices operating in FR1, indoor deployment scenarios for FR2, urban/suburban deployment scenarios for FR2, time domain duplex (TDD) and frequency domain duplex (FDD) for FR1, voice over IP (VoIP) and enhanced mobile broadband (eMBB) service for FR1, eMBB service as a first priority and VoIP as a second priority for FR2, etc.

One objective of the coverage enhancements for NR systems is to increase coverage performance for the downlink (DL) channels including the physical downlink shared channel (PDSCH) for FR2. Another objective is to increase coverage performance for the uplink (UL) channels including the physical uplink shared channel (PUSCH) and the physical uplink control channel (PUCCH) for FR1. Solutions to address these objectives include time domain repetitions of transmissions up to a certain number. However, such time-domain solutions may not be sufficient to achieve the extremely long range coverage extension needed in rural deployment. Another shortcoming of existing solutions is a failure to support the coverage extension of PUSCH carrying message 3 (Msg3) when a wireless device attempts to connect or synchronize with the serving base station during random access. The reason is that when the wireless device transmits Msg3, radio resource control (RRC) signaling connection has not been established. Thus, the base station may not be able to configure the wireless device with the RRC parameters to extend the coverage. There is a need to improve the NR coverage, including the PDSCH, PUSCH, PUCCH channels, and to support the coverage extension of PUSCH carrying Msg3 so it is aligned with other UL channels.

SUMMARY

Methods to enhance the coverage of NR systems for coverage-limited wireless devices such as user equipment (UE) are disclosed. A serving base station may configure a coverage-limited UE with parameters for the UE to operate in a coverage enhancement mode through RRC signaling, downlink control information (DCI), or random access response (RAR) grant. The UE may use the configuration parameters to determine whether to enter into the coverage enhancement mode when connecting and communicating with the serving base station. The configuration parameters may configure the UE to exploit both time diversity and frequency diversity to extend and enhance coverage when receiving the PDSCH channel and when transmitting the PUSCH and PUCCH channels. Advantageously, the base station may flexibly and dynamically configure the UE with coverage enhancement parameters to extend the coverage of the UE using time diversity and frequency diversity gains as the UE moves around.

In one embodiment, the configuration parameters for the coverage-limited UE to operate in the coverage enhancement mode may include PDSCH, PUSCH, and PUCCH configuration parameters. The UE may use the PDSCH configuration parameters to receive downlink data packets that are coverage enhanced using time domain repetitions and frequency hopping. In one embodiment, the UE may use the PDSCH configuration parameters to receive physical downlink control channel (PDCCH) that is coverage enhanced using time domain repetitions and frequency hopping. In one embodiment, the PDCCH may be coverage enhanced using its own PDCCH configuration parameters. The UE may use the PUSCH configuration parameters for scheduling coverage enhanced PUSCH transmissions and type-1 and type-2 PUSCH with configured grant using time domain repetitions and frequency hopping. The UE may use the PUCCH configuration parameters to transmit PUCCH channels that are coverage enhanced using time domain repetitions and frequency hopping.

In one embodiment, the configuration parameters for the coverage-limited wireless device to operate in the coverage enhancement mode may include configuration parameters for PUSCH Msg3 transmission. The UE may use the PUSCH Msg3 configuration parameters to transmit PUSCH Msg3 during random access using time domain repetitions and frequency hopping.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 7 illustrates extensions to the RAR grant field to add configuration parameters used for PUSCH Msg3 transmission from a coverage-limited UE in accordance with some embodiments of the disclosure.

DETAILED DESCRIPTION

Figure 1:
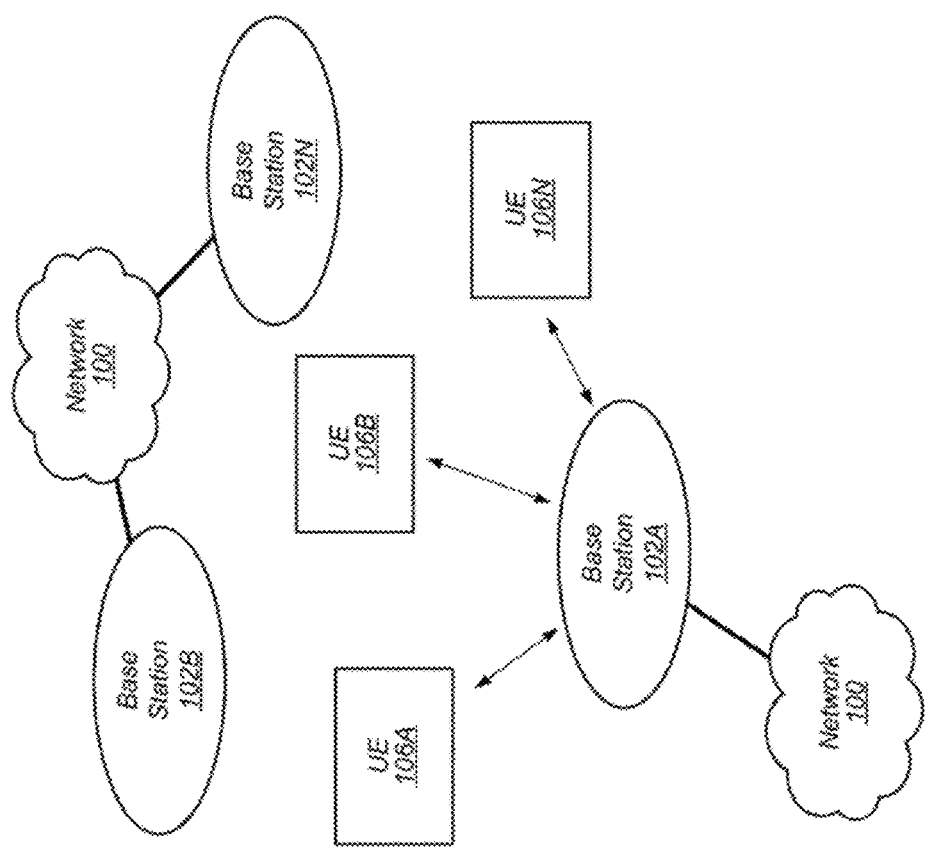
FIG. 1 illustrates an example wireless communication system in accordance with some embodiments of the disclosure.

Disclosed are techniques to enhance the coverage of NR systems. A serving base station may through RRC signaling configure a coverage-limited UE with parameters for the UE to operate in the coverage enhancement mode. In one embodiment, the UE may be configured with a synchronization signal block (SSB) reference signal received power (RSRP) measurement threshold. The UE may determine whether to activate the coverage enhancement mode based on measuring the DL SSB RSRP and comparing the measured SSB RSSP with the SSB RSRP threshold. In one embodiment, the base station may allocate reserved preambles to the coverage-limited UE. The reserved preambles may be selected from a pool of contention-free preambles. When the UE activates the coverage enhancement mode, the UE may select one of the reserved preambles when requesting random access.

In one embodiment, the configuration parameters for the coverage-limited UE to operate in the coverage enhancement mode may include PDSCH configuration parameters. The UE may use the PDSCH configuration parameters to receive downlink data packets that are coverage enhanced using time domain repetitions and frequency hopping. The PDSCH coverage enhancement configuration parameter may include the number of repetitions for each frequency hop, the total number of repetitions, the number of frequency hops, hopping pattern parameters such as two-step hopping or four-step hopping and hopping offset, etc.

In one embodiment, the configuration parameters for the coverage-limited UE to operate in the coverage enhancement mode may include PUSCH configuration parameters. The UE may use the PUSCH configuration parameters for scheduling coverage enhanced PUSCH transmissions and type-1 and type-2 PUSCH with configured grant using time domain repetitions and frequency hopping. The PUSCH coverage enhancement configuration parameters may include the number of repetitions for each frequency hop, the total number of repetitions, the number of frequency hops, hopping pattern parameters such as two-step hopping or four-step hopping and hopping offset, etc.

In one embodiment, the configuration parameters for the coverage-limited UE to operate in the coverage enhancement mode may include PUCCH configuration parameters. The UE may use the PUCCH configuration parameters to transmit PUCCH channels that are coverage enhanced using time domain repetitions and frequency hopping. The PUCCH coverage enhancement configuration parameters may include the number of repetitions for each frequency hop, the total number of repetitions, the number of frequency hops, etc.

In one embodiment, the configuration parameters for the coverage-limited UE to operate in the coverage enhancement mode may include configuration parameters for PUSCH Msg3 transmission. The UE may use the PUSCH Msg3 configuration parameters to transmit PUSCH Msg3 during random access using time domain repetitions and frequency hopping when the UE is in various random access states such as RRC_IDLE, RRC_INACTIVE, or RRC_CONNECTED modes. The PUSCH Msg3 configuration parameters may include the number of repetitions for each frequency hop, the total number of repetitions, the number of frequency hops, modulation and coding scheme (MCS) information, etc. The PUSCH Msg3 configuration parameters may be received from the serving base station through RAR grant.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB.'

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible. A UE 106 may measure the time of arrival (TOA) of positioning reference signals (PRS) transmitted by its serving base station 102A and by base stations 102B-N of the neighboring cells to support position determination of UE 106.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
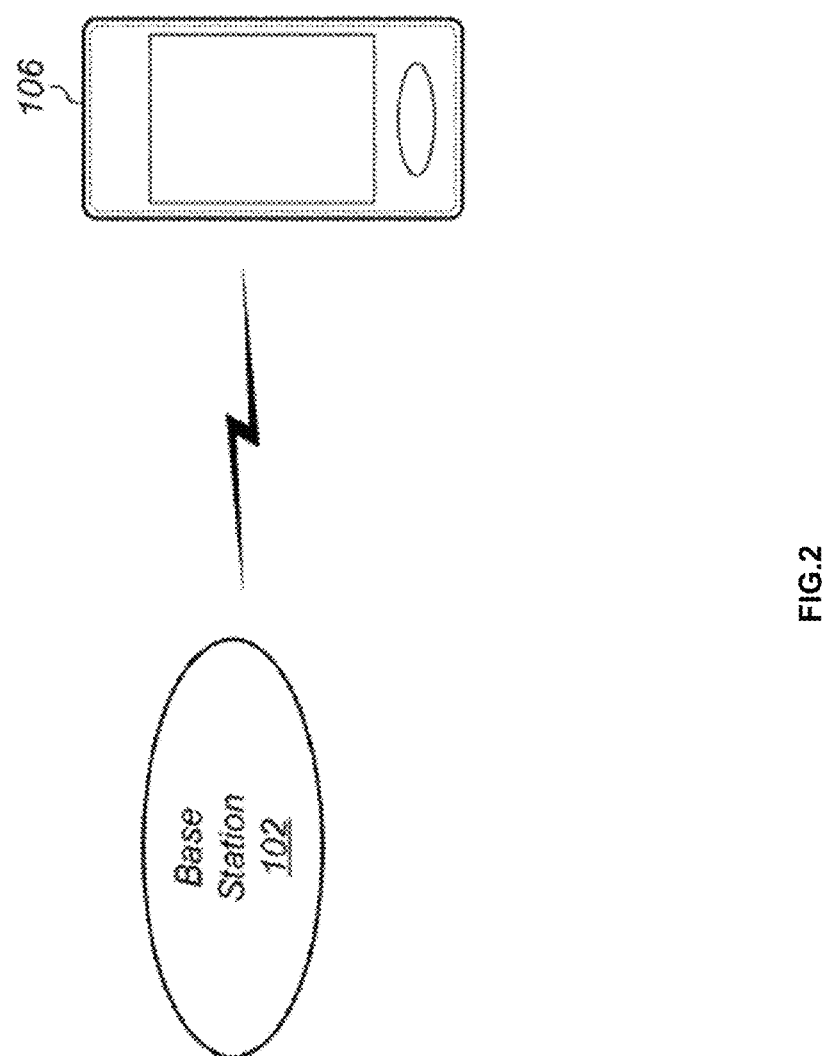
FIG. 2 illustrates a base station (BS) in communication with a user equipment (UE) device in accordance to some embodiments of the disclosure.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE or 5G NR using a single shared radio and/or GSM or LTE or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
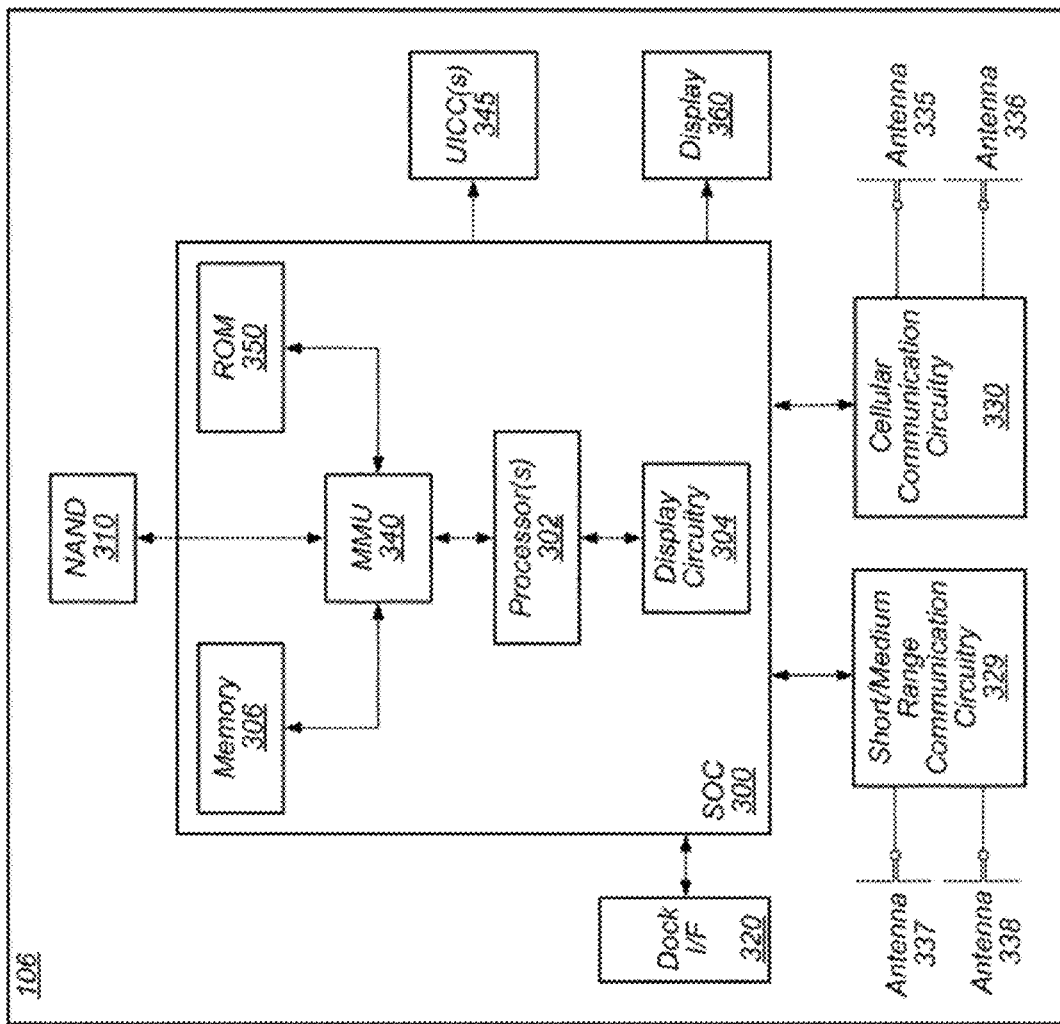
FIG. 3 illustrates an example block diagram of a UE in accordance with some embodiments of the disclosure.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA (Non-Standalone) NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
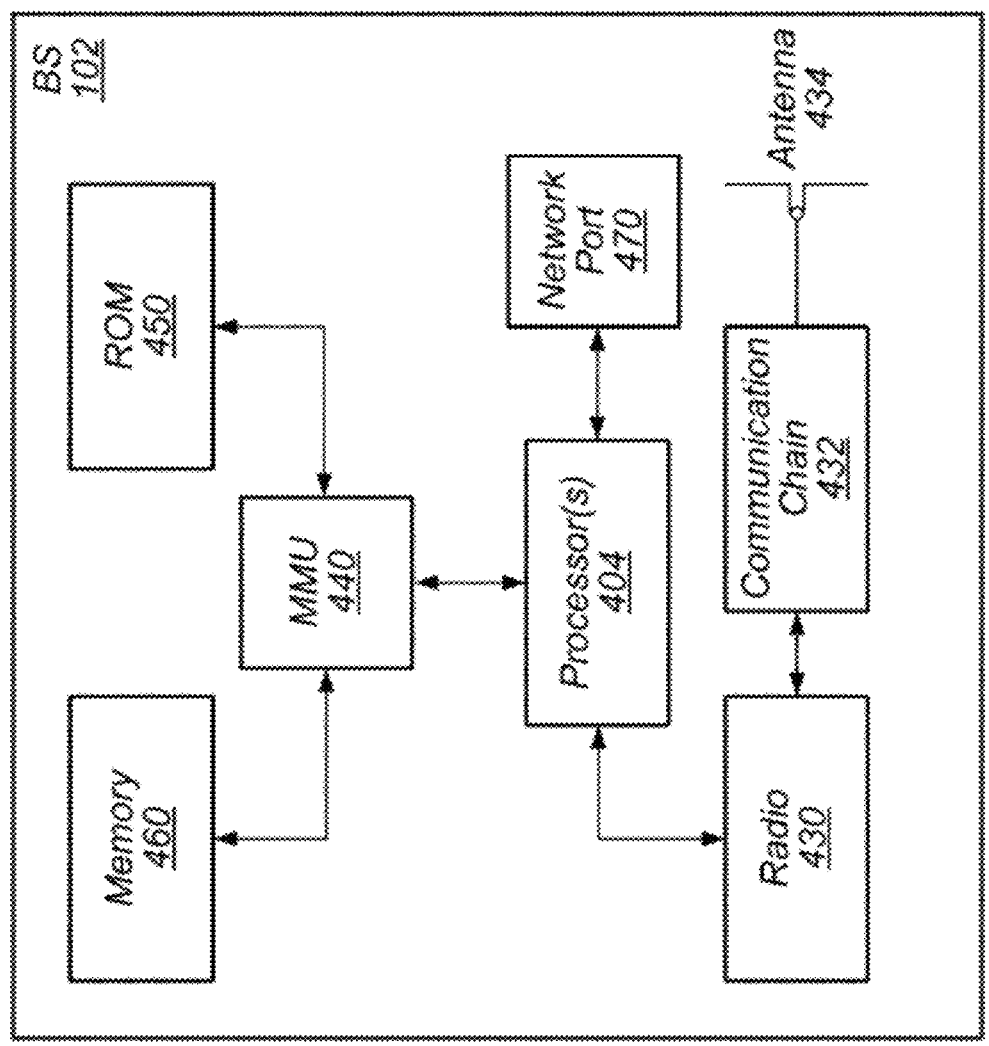
FIG. 4 illustrates an example block diagram of a BS in accordance with some embodiments of the disclosure.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs).

In addition, a UE capable of operating according to 5G NR may be connected to one or more TRPs within one or more gNB's.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.). As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
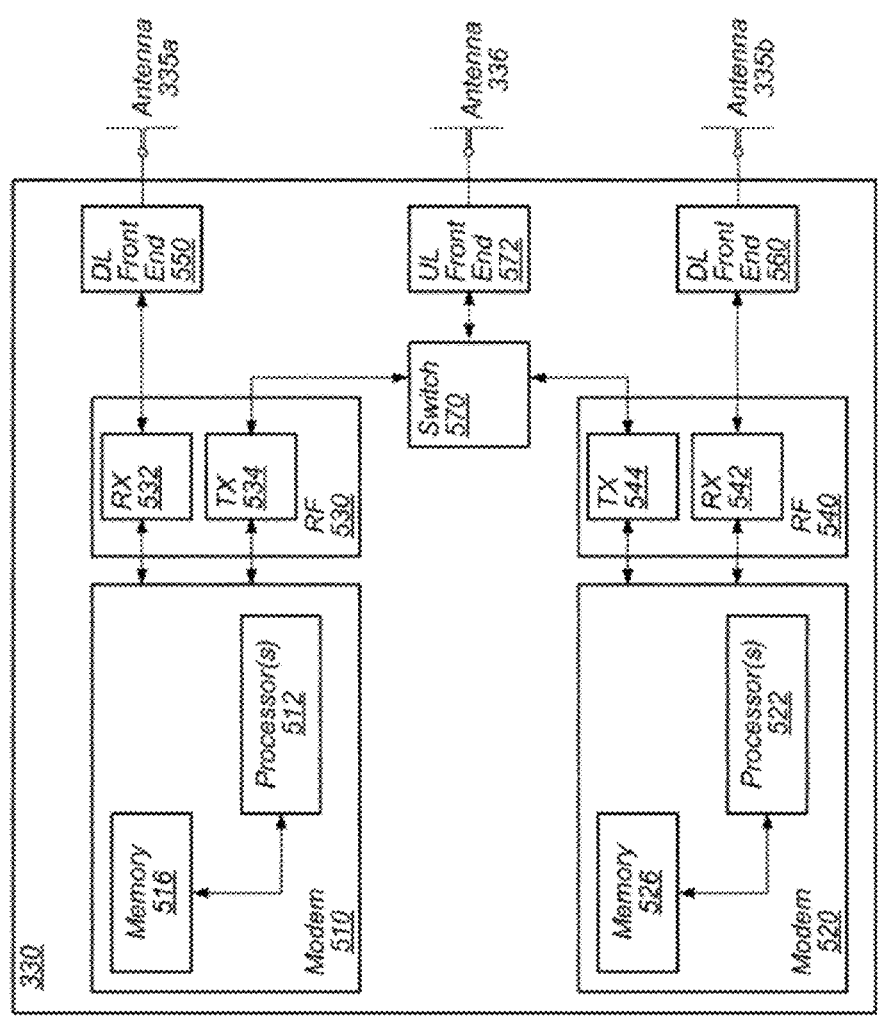
FIG. 5 illustrates an example block diagram of cellular communication circuitry in accordance with some embodiments of the disclosure.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335 a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335 b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
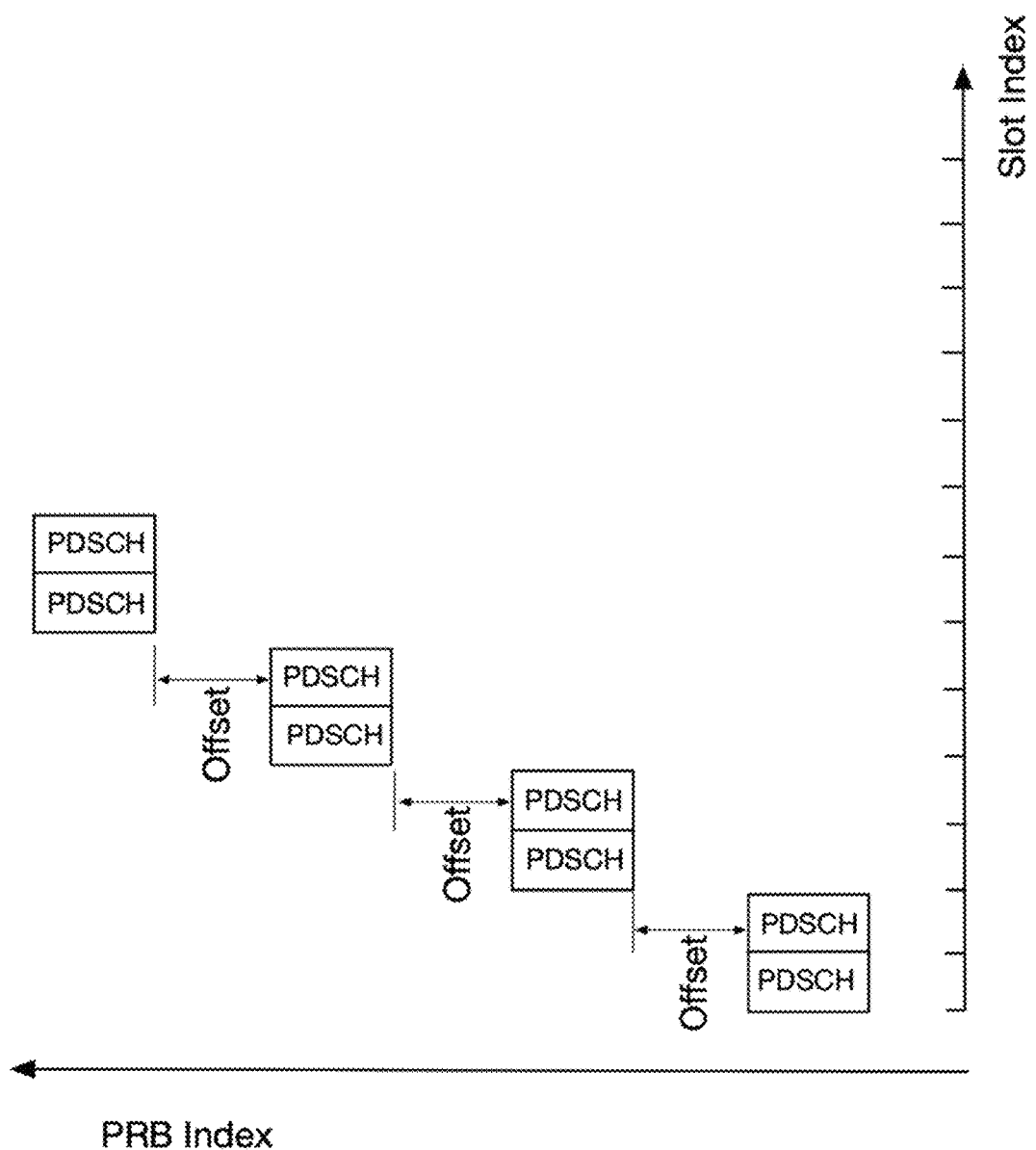
FIG. 6 illustrates PDSCH time domain repetition and frequency hopping used to enhance the coverage of PDSCH for a coverage-limited UE in accordance with some embodiments of the disclosure.

FIG. 6 illustrates PDSCH time domain repetition and frequency hopping used to enhance the coverage of PDSCH for a coverage-limited UE device in accordance with some embodiments of the disclosure. A base station 102 through RRC signaling and DCI may configure the coverage-limited UE 106 with PDSCH configuration parameters for the UE 106 to receive PDSCH transmissions that are coverage enhanced using time domain repetitions and frequency hopping. The UE 106 may receive PDSCH transmission in the coverage enhancement mode using the configured time domain repetitions and frequency hopping parameters to achieve frequency diversity and time diversity gains. The PDSCH coverage enhancement configuration parameter may include the number of repetitions for each frequency hop, the total number of repetitions, the number of frequency hops, hopping pattern parameters such as two-step hopping or four-step hopping and hopping offset, etc. In one embodiment, the UE 106 may also receive PDCCH transmission in the coverage enhancement mode using the configured time domain repetitions and frequency hopping parameters of the PDSCH configuration parameters to achieve frequency diversity and time diversity gains. In one embodiment, the base station 102 may configure the UE 106 with separate PDCCH configuration parameters for the UE 106 to receive PDCCH transmissions that are coverage enhanced using time domain repetitions and frequency hopping. The PDCCH coverage enhancement configuration parameters may be the same as those of the PDSCH.

The base station 102 may configure a downlink bandwidth part (DL BWP) threshold. The DL BWP physical resource blocks (PRBs) assigned to the UE may be compared with the DL BWP threshold. If the DL BWP PRBs are lower than the DL BWP threshold, a two-step hopping pattern may be applied. In one embodiment, the frequency domain resources of the first hop are indicated via DCI. The second domain resources of the second hop may be determined via an PRB offset from those of the first hop. The base station 102 may configure the PRB offset using RRC signaling.

Otherwise, if the DL BWP PRBs are larger or equal to the DL BWP threshold, a four-step hopping pattern may be applied. As mentioned, the frequency domain resources of the first hop may be indicated via DCI. The frequency domain resources of the second hop, third hop, and fourth hop are determined via the PRB offset that is received by RRC signaling. The PRB offset for each frequency hop may be the same. In one embodiment, the determination of the two-step or the four-step hopping pattern may be configured using RRC signaling In one embodiment, the starting slot for the time domain repetition of the PDSCH transmission may be derived from DCI. The same PDSCH transmission may repeat for the configured total number of repetitions. RRC signaling may be used to configure the number of repetitions for each frequency hop and the total number of repetitions. The number of hops may be determined by dividing the total number of repetitions by the total number of repetitions for each frequency hop. In one embodiment, the number of PDSCH repetition for each frequency hop may be 1, 2, 4, or 8. The total number of PDSCH repetitions may be 2, 4, 8, 16, or 32.

In FIG. 6, the PDSCH transmissions have total of 8 repetitions and 4 frequency hops. Each frequency hop has two repetitions. If the number of repetitions are 16 or 32, the same time and frequency hopping pattern is repeated 2 or 3 times, respectively. In one embodiment, wraparound of the PRBs may be applied if after frequency hopping the frequency domain resources extend beyond the BWP bandwidth. In one embodiment, if the PRBs are overlapped with synchronization signal block (SSB) or positioning reference signals (PRS) or other system information transmitted by the base station 102, the UE 106 may assume that the PRBs are not used for the UE specific PDSCH transmission.

In one embodiment, base station 102 through RRC signaling and DCI may configure the coverage-limited UE 106 with PUSCH configuration parameters for the UE 106 to transmit PUSCH that is coverage enhanced using time domain repetitions and frequency hopping. The UE 106 may schedule coverage enhanced PUSCH transmissions and type-1 and type-2 PUSCH transmission using configured grant using the configured time domain repetitions and frequency hopping parameters to achieve frequency diversity and time diversity gains. The PUSCH coverage enhancement configuration parameter may include the number of repetitions for each frequency hop, the total number of repetitions, the number of frequency hops, hopping pattern parameters such as two-step hopping or four-step hopping and hopping offset, etc.

The base station 102 may configure an uplink bandwidth part (UL BWP) threshold. The UE 106 may compare the allocated UL BWP PRBs with the UL BWP threshold. If the UL BWP PRBs are lower than the UL BWP threshold, a two-step hopping pattern may be applied. In one embodiment, the frequency domain resources of the first hop are indicated via DCI. The second domain resources of the second hop may be determined via an PRB offset from those of the first hop. The base station 102 may configure the PRB offset using RRC signaling.

Otherwise, if the UL BWP PRBs are larger or equal to the UL BWP threshold, a four-step hopping pattern may be applied. As mentioned, the frequency domain resources of the first hop may be indicated via DCI. The frequency domain resources of the second hop, third hop, and fourth hop are determined via the PRB offset that is received by RRC signaling. The PRB offset for each frequency hop may be the same. In one embodiment, the determination of the two-step or the four-step hopping pattern may be configured using RRC signaling In one embodiment, the starting slot for the time domain repetition of the PUSCH transmission may be derived from DCI. The same PUSCH transmission may repeat for the configured total number of repetitions. RRC signaling may be used to configure the number of repetitions for each frequency hop and the total number of repetitions. The number of hops may be determined by dividing the total number of repetitions by the total number of repetitions for each frequency hop. In one embodiment, the number of PUSCH repetition for each frequency hop may be 1, 2, 4, or 8. The total number of PUSCH repetitions may be 2, 4, 8, 16, or 32. In one embodiment, wraparound of the PRBs may be applied if after frequency hopping the frequency domain resources extend beyond the BWP bandwidth.

In one embodiment, base station 102 through RRC signaling and DCI may configure the coverage-limited UE 106 with PUCCH configuration parameters for the UE 106 to transmit PUCCH that is coverage enhanced using time domain repetitions and frequency hopping. The UE may transmit PUCCH channels in the coverage enhancement mode using the configured time domain repetitions and frequency hopping parameters to achieve frequency diversity and time diversity gains. The PUCCH coverage enhancement configuration parameters may include the number of repetitions for each frequency hop, the total number of repetitions, the number of frequency hops, etc.

In one embodiment, the frequency domain resources of the first hop for the coverage-enhanced PUCCH transmissions are indicated via DCI. The second frequency domain resources of the additional hops may be determined via an PRB offset from those of the first hop. The base station 102 may configure the PRB offset using RRC signaling. The PRB offset for each frequency hop may be the same.

In one embodiment, the starting slot for the time domain repetition of the PUCCH transmission may be derived from DCI. The same PUCCH transmission may repeat for the configured total number of repetitions. RRC signaling may be used to configure the number of repetitions for each frequency hop and the total number of repetitions. The number of hops may be determined by dividing the total number of repetitions by the total number of repetitions for each frequency hop. In one embodiment, the number of PUCCH repetition for each frequency hop may be 1, 2, 4, or 8. The total number of PUCCH repetitions may be 2, 4, 8, 16, or 32. In one embodiment, wraparound of the PRBs may be applied if after frequency hopping the frequency domain resources extend beyond the BWP bandwidth.

In one embodiment, the configuration parameters for the coverage-limited UE 106 to operate in the coverage enhancement mode may include configuration parameters for PUSCH Msg3 transmission. The UE 106 may use the PUSCH Msg3 configuration parameters to transmit PUSCH Msg3 using time domain repetitions in addition to frequency hopping when the UE is in various random access states such as RRC_IDLE, RRC_INACTIVE, or RRC_CONNECTED to achieve time diversity and frequency diversity gains.

For example, when the UE 106 is in the RRC_CONNECTED or RRC_INACTIVE mode, the PUSCH Msg3 configuration parameters may be included in PUSCH Msg3 transmission related information of the coverage enhancement mode indication received from the serving base station 102 through previous RCC signaling, DCI, or RAR grant. In one embodiment, the PUSCH Msg3 configuration parameters may include the number of repetitions for each frequency hop, the total number of repetitions, modulation and coding scheme (MCS) information, an enable/disable indication for the coverage enhanced mode or the inter-slot frequency hopping indication, etc. In one embodiment, the number of frequency hops may not be explicitly configured because it may be determined by dividing the total number of repetitions by the number of repetitions for each frequency hop. In one embodiment, the number of PUSCH Msg3 repetition for each frequency hop may be 2, 4, or 8. The total number of PUSCH Msg3 repetitions may be 2, 4, 8, or 16. The PUSCH Msg3 MCS information may indicate a QAM64 table or a QAM64LowSE table.

When the UE 106 is in the RRC_IDLE mode, the UE 106 may receive the PUSCH Msg3 configuration parameters through RAR grant. The PUSCH Msg3 configuration parameters may also include the number of repetitions for each frequency hop, the total number of repetitions, MCS information, an enable/disable indication for the coverage enhanced mode or the inter-slot frequency hopping indication, etc. In one embodiment, the number of PUSCH Msg3 repetition for each frequency hop may be 2, 4, or 8. The total number of PUSCH Msg3 repetitions may be 2, 4, 8, or 16. The PUSCH Msg3 MCS information may indicate a QAM64 table or a QAM64LowSE table.

The RAR grant may be extended to include the fields for the coverage enhancement mode configuration parameters for PUSCH Msg3. In one embodiment, there may be a one-bit field in the RAR grant for the inter-slot frequency hopping enable/disable indication and a separate two-bit field in the RAR grant to indicate the number of repetitions for each frequency hop. In one embodiment, two bits in the RAR grant may jointly encode the inter-slot frequency hopping enable/disable indication and the number of repetitions for each frequency hop. For example, code 00 may encode no frequency hopping; code 01 may encode frequency hopping with a repetition number of 2; code 10 may encode frequency hopping with a repetition number of 4; and code 11 may encode frequency hopping with a repetition number of 8.

FIG. 7 illustrates extensions to the RAR grant field to add configuration parameters used for PUSCH Msg3 transmission from coverage-limited UE device in accordance with some embodiments of the disclosure. In FIG. 7, the RAR fields have been extended to include a 2-bit field to encode the total number of repetitions, a 1-bit field to indicate the MCS table, a 1-bit field to enable or disable inter-slot frequency hopping, and a 2-bit field to encode the number of repetitions for each frequency hop.

In one embodiment, the PUSCH Msg3 configuration parameters may be included both in information related to the coverage enhancement mode indication and in the RAR grant. The UE 106 may choose which set of configuration parameters to use as a function of the random access states. For example, when the UE 106 performs random access from the RRC_IDLE mode, the configuration parameters indicated by the coverage enhancement mode is used for PUSCH Msg3 transmission. The configuration parameters may include the number of repetitions for each frequency hop, the total number of repetitions, MCS table indication, the enable/disable indication for the coverage enhanced mode or the inter-slot frequency hopping indication, etc. In one embodiment, QAM64 for the MCS table indication may be assumed if QAM64LowSE is not mandatory. The related configuration parameters included in RAR grant may be ignored or the RAR grant simply may not include the PUSCH Msg3 configuration parameters.

When the UE 106 performs random access from the RRC_INACTIVE or RRC_CONNECTED mode, the PUSCH Msg3 configuration fields are applied to determine the PUSCH Msg3 transmission. The benefit for the separate handling of PUSCH Msg3 transmissions of the UE 106 in different states is that after the UE 106 connects to the network, the base station 102 may obtain information about the channel from the UE 106 and may change the PUSCH Msg3 configuration parameters to adjust the PUSCH Msg3 transmission. For example, the base station 102 may adjust the number of repetitions for each frequency hop, the total number of repetitions, or the MCS table indication. In addition, the base station 102 may dynamically disable or enable the frequency hopping for an individual UE 106 according to the network loading. The UE 106 also is not required to have QAM62LowSE capability.

Figure 8:
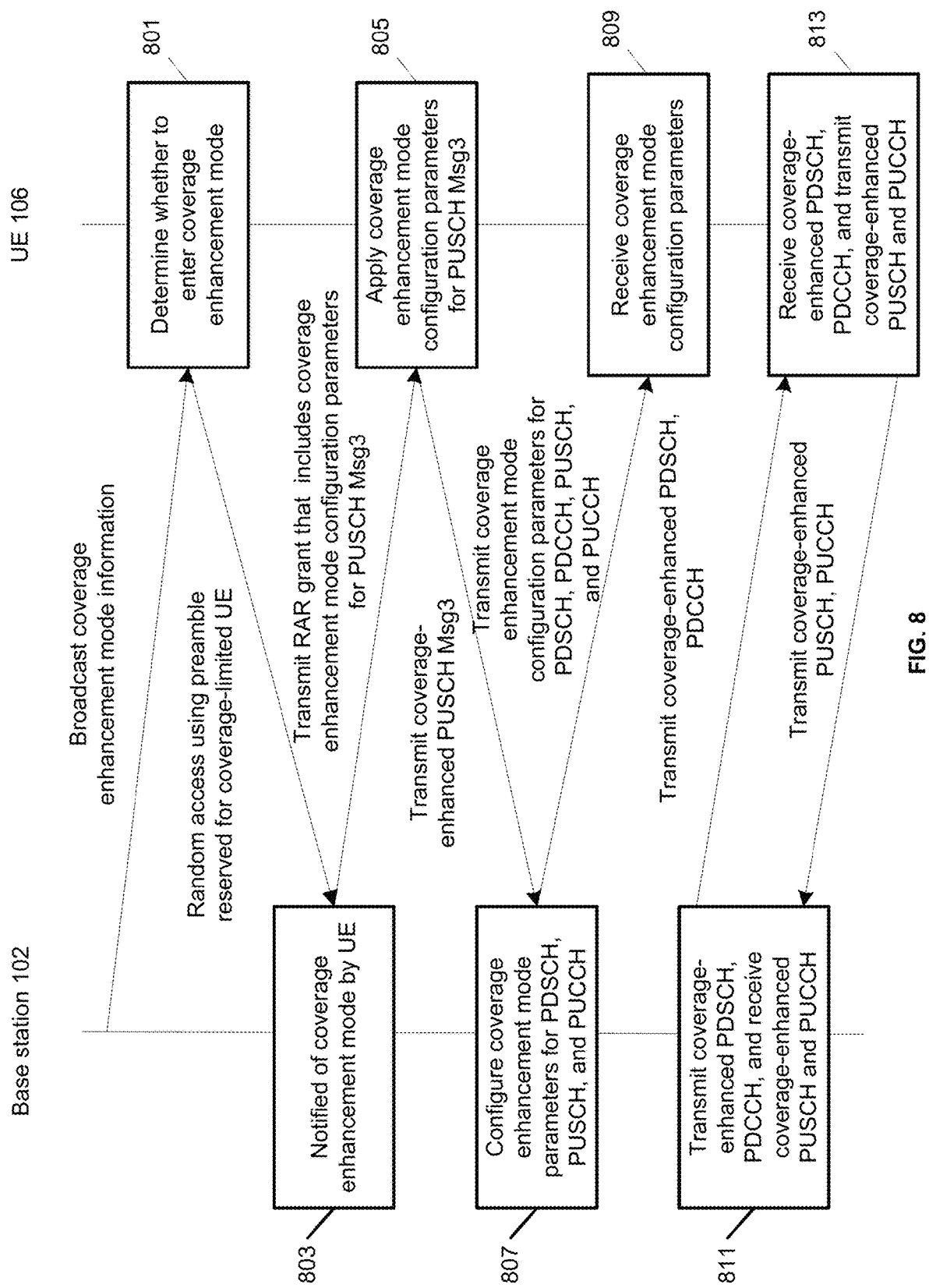
FIG. 8 illustrates a data flow diagram for a coverage-limited UE to enter the coverage enhancement mode to transmit PUSCH Msg3 during random access, to receive coverage-enhanced PDSCH, PDCCH channel, and to transmit coverage-enhanced PUSCH, PUCCH channels when connected with the serving base station in accordance with some embodiments of the disclosure.

FIG. 8 illustrates a data flow diagram for a coverage-limited UE 106 to enter the coverage enhancement mode to transmit PUSCH Msg3 during random access, to receive coverage-enhanced PDSCH, PDCCH channels, and to transmit coverage-enhanced PUSCH, PUCCH channels when connected with the serving base station 102 in accordance with some embodiments of the disclosure. During random access, a coverage-limited UE 106 may determine whether to enter the coverage enhancement mode based on the channel condition and may indicate to the base station 102 that it desires to operate in the coverage enhancement mode. Referring to FIG. 8, the base station 102 may broadcast configuration information for the coverage enhancement mode to UEs to indicate that the coverage enhancement mode is supported by the network. For example, the UE 106 may be informed via the system information with a synchronization signal block (SSB) reference signal received power (RSRP) measurement threshold. The base station 102 may also allocate reserved preambles to the coverage-limited UE. The reserved preambles may be selected from a pool of contention-free preambles.

At operation 801, the UE 106 may determine whether to enter the coverage enhancement mode based on measurement of the DL SSB RSRP and comparing the measured SSB RSRP with the SSB RSRP threshold. If the measured SSB RSRP is lower than the SSB RSRP threshold, the UE 106 may select and transmit the corresponding reserved preamble to the base station 102 to initiate the random access.

At operation 803, the base station 102 may be notified that the coverage-limited UE desires to operate in the coverage enhancement mode based on receiving the reserved preamble. The base station 102 may then transmit the RAR grant to the UE 106. The RAR grant may include the fields for the coverage enhancement mode configuration parameters for PUSCH Msg3.

At operation 805, the UE 106 may decode and apply the configuration parameters to determine the PUSCH Msg3 transmission. The UE 106 may transmit the coverage-enhanced PUSCH Msg3 to the base station 102.

At operation 807, after the UE 106 is connected with the base station 102, the base station 102 may configure the parameters for operating the PDSCH, PDCCH, PUSCH, and PUCCH with the UE 106 in the coverage enhancement mode. The base station 102 may transmit the coverage enhancement mode configuration parameters for PDSCH, PDCCH, PUSCH, and PUCCH to the UE 106.

At operation 809, the UE 106 may receive and apply the coverage enhancement mode configuration parameters for PDSCH, PDCCH, PUSCH, and PUCCH. At operation 811, the base station 102 may transmit the coverage-enhanced PDSCH and PDCCH to the UE 106, and may receive the coverage-enhanced PUSCH and PUCCH from the UE 106.

At operation 813, the UE 106 may receive PDSCH and PDCCH in the coverage enhancement mode using the configured time domain repetitions and frequency hopping parameters to achieve frequency diversity and time diversity gains. The UE 106 may transmit PUSCH and PUCCH in the coverage enhancement mode using the configured time domain repetitions and frequency hopping parameters to achieve frequency diversity and time diversity gains.

Advantageously, the base station 102 may flexibly and dynamically configure the UE 106 with coverage enhancement parameters to extend the coverage of the UE 106 using time diversity and frequency diversity gains as the UE 106 moves around.

Figure 9:
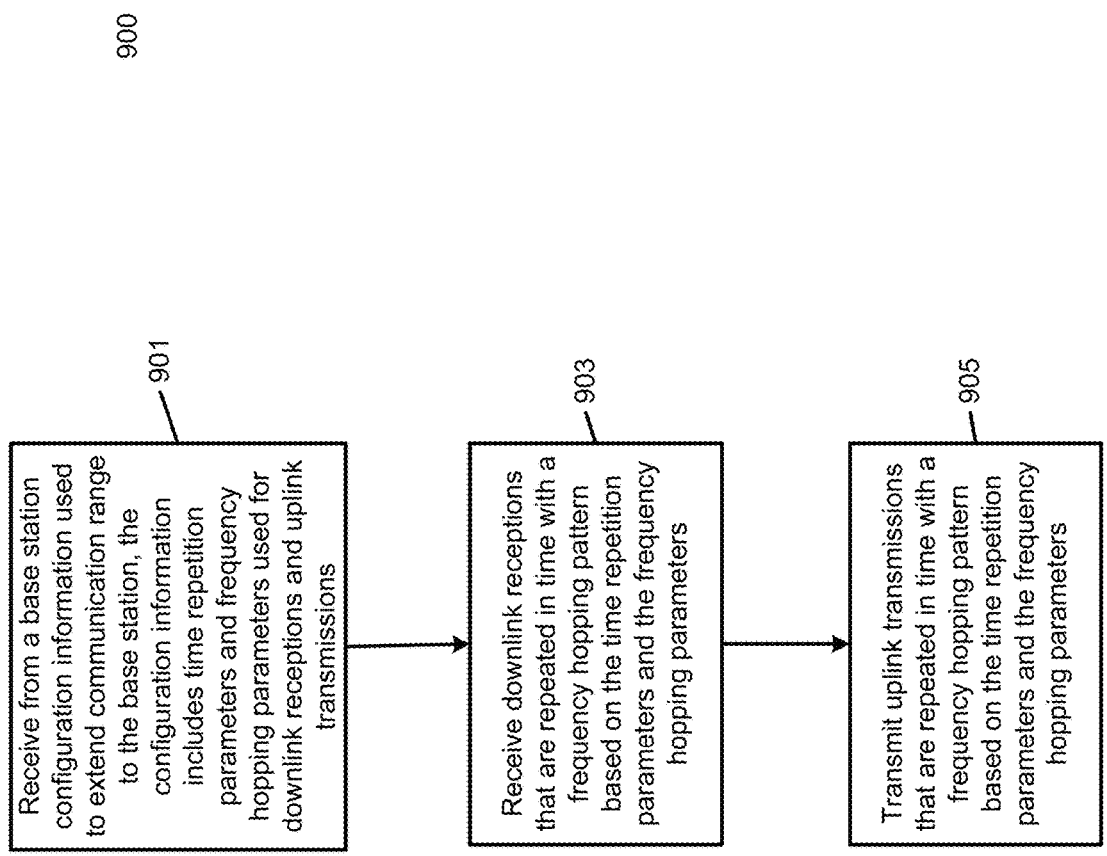
FIG. 9 is a flow diagram illustrating an example of a method for a coverage-limited UE to receive, from a base station, configuration parameters for the coverage enhancement mode and for the UE to operate coverage-enhanced PDSCH, PDCCH, PUSCH, and PUCCH channels in accordance with some embodiments of the disclosure.

FIG. 9 is a flow diagram illustrating an example of a method 900 for a coverage-limited UE to receive, from a base station, configuration parameters for the coverage enhancement mode and for the UE to operate coverage-enhanced PDSCH, PDCCH, PUSCH, and PUCCH channels in accordance with some embodiments of the disclosure. Method 900 may be performed by processing logic which may include software, hardware, or a combination thereof. For example, method 900 may be performed by processors 302 or cellular communication circuitry 330 of the UE 106 such as described in conjunction with FIGS. 1-5.

At operation 901, the UE receives from a base station configuration information used to extend communication range to the base station. The configuration information includes time repetition parameters and frequency hopping parameters used for downlink receptions and uplink transmissions.

At operation 903, the UE receives from the base station downlink receptions that are repeated in time with a frequency hopping pattern based on the time repetition parameters and the frequency hopping parameters in the configuration information.

At operation 905, the UE transmits to the base station uplink transmissions that are repeated in time with a frequency hopping pattern based on the time repetition parameters and the frequency hopping parameters in the configuration information.

Figure 10:
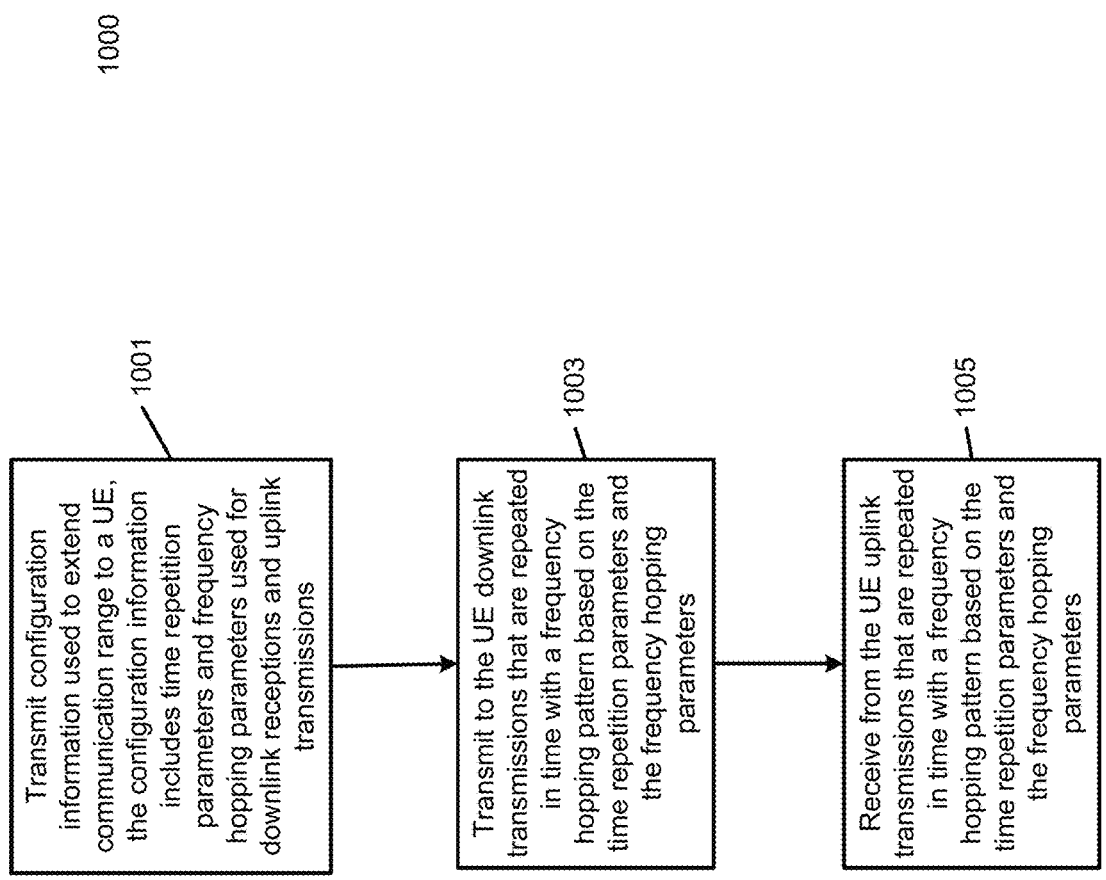
FIG. 10 is a flow diagram illustrating an example of a method for a base station to transmit configuration parameters for the coverage enhancement mode for a coverage-limited UE, and for the base station to operate coverage-enhanced PDSCH, PDCCH, PUSCH, and PUCCH channels with the UE in accordance with some embodiments of the disclosure.

FIG. 10 is a flow diagram illustrating an example of a method 1000 for a base station to transmit configuration parameters for the coverage enhancement mode for a coverage-limited UE, and for the base station to operate coverage-enhanced PDSCH, PDCCH, PUSCH, and PUCCH channels with the UE in accordance with some embodiments of the disclosure. Method 1000 may be performed by processing logic which may include software, hardware, or a combination thereof. For example, method 1000 may be performed by processors 404 of the base station 102 (e.g., gNB), such as described in conjunction with FIGS. 1-5.

At operation 1001, the base station transmits configuration information used to extend communication range to a coverage-limited UE. The configuration information includes time repetition parameters and frequency hopping parameters used for downlink receptions and uplink transmissions.

At operation 1003, the base station transmits to the UE downlink transmissions that are repeated in time with a frequency hopping pattern based on the time repetition parameters and the frequency hopping parameters in the configuration information.

At operation 1005, the base station receives from the UE uplink transmissions that are repeated in time with a frequency hopping pattern based on the time repetition parameters and the frequency hopping parameters in the configuration information.

Embodiments of the method and apparatus described herein for supporting reduced capability devices in a wireless network may be implemented in a data processing system, for example, by a network computer, network server, tablet computer, smartphone, laptop computer, desktop computer, other consumer electronic devices or other data processing systems. In particular, the operations described are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method of communicating by a wireless device, the method comprising:
   receiving, by the wireless device from a base station of a wireless communication network, configuration information used to extend a communication range of the wireless device when communicating with the base station, the configuration information including time repetition parameters and frequency hopping parameters used for downlink receptions and uplink transmissions by the wireless device, wherein the time repetition parameters and frequency hopping parameters comprise a number of time repetitions for each frequency hop;

receiving, by the wireless device from the base station, downlink receptions that are repeated in time with a frequency hopping pattern based on the time repetition parameters and the frequency hopping parameters in the configuration information; and transmitting, by the wireless device to the base station, uplink transmissions that are repeated in time with the frequency hopping pattern based on the time repetition parameters and the frequency hopping parameters in the configuration information.

2. The method of claim 1, wherein the time repetition parameters and the frequency hopping parameters further comprise:
   a total number of time repetitions; and
   the frequency hopping pattern.

3. The method of claim 2, wherein the downlink receptions that are repeated in time with the frequency hopping pattern comprise data or control channel that are repeated using resources comprising:
   time domain resources starting from a starting slot and consecutively incrementing a slot number for the total number of time repetitions; and
   frequency domain resources including a first frequency hop resource, a second frequency hop resource at the first frequency hop resource plus a frequency offset, and additional frequency hop resources at the first frequency hop resource plus additional iterations of the frequency offset to complete the frequency hopping pattern, wherein each of the frequency hop resources is repeated in the time domain for the number of time repetitions for each frequency hop.

4. The method of claim 3, wherein the resources used for the downlink receptions that are repeated in time with the frequency hopping pattern are preempted by resources used for transmitting system information by the base station.

5. The method of claim 2, wherein the uplink transmissions that are repeated in time with the frequency hopping pattern comprise data channel that are repeated using resources comprising:
   time domain resources starting from a starting slot and consecutively incrementing a slot number for the total number of time repetitions; and
   frequency domain resources including a first frequency hop resource, a second frequency hop resource at the first frequency hop resource plus a frequency offset, and additional frequency hop resources at the first frequency hop resource plus additional iterations of the frequency offset to complete the frequency hopping pattern, wherein each of the frequency hop resources is repeated in the time domain for the number of time repetitions for each frequency hop.

6. The method of claim 2, wherein the frequency hopping pattern is a function of a number of frequency domain resources assigned to the wireless device.

7. The method of claim 2, wherein the total number of time repetitions comprises at least one of 12, 16, 24, or 32.

8. The method of claim 1,
   wherein receiving by the wireless device the configuration information comprises receiving by the wireless device the configuration information from the base station when the wireless device initiates a connection request to the base station, the configuration information including time repetition parameters and frequency hopping parameters for uplink transmissions by the wireless device when completing the connection request, and
   wherein transmitting by the wireless device the uplink transmissions comprises transmitting by the wireless device to the base station a handshaking message to complete the connection request, wherein the handshaking message is repeated in time with the frequency hopping pattern based on the time repetition parameters and the frequency hopping parameters received when the wireless device initiates the connection request.

9. The method of claim 8, wherein the configuration information further includes information on a modulation and coding scheme used for transmitting the handshaking message by the wireless device.

10. A wireless device, comprising:
    at least one radio, wherein the at least one radio is configured to communicate with a base station of a wireless communication network using at least one antenna; and
    at least one processor coupled to the at least one radio, wherein the at least one processor is configured to:
    receive from the base station configuration information used to extend a communication range of the wireless device when the wireless device communicates with the base station, the configuration information including time repetition parameters and frequency hopping parameters used for downlink receptions and uplink transmissions by the wireless device, wherein the time repetition parameters and frequency hopping parameters comprise a number of time repetitions for each frequency hop;
    receive from the base station downlink receptions that are repeated in time with a frequency hopping pattern based on the time repetition parameters and the frequency hopping parameters in the configuration information; and
    transmit to the base station uplink transmissions that are repeated in time with the frequency hopping pattern based on the time repetition parameters and the frequency hopping parameters in the configuration information.

11. The wireless device of claim 10, wherein the time repetition parameters and frequency hopping parameters further comprise:
    a total number of time repetitions; and
    the frequency hopping pattern.

12. The wireless device of claim 11, wherein the downlink receptions that are repeated in time with the frequency hopping pattern comprise data or control channel that are repeated using resources comprising:
    time domain resources starting from a starting slot and consecutively incrementing a slot number for the total number of time repetitions; and
    frequency domain resources including a first frequency hop resource, a second frequency hop resource at the first frequency hop resources plus a frequency offset, and additional frequency hop resource at the first frequency hop resource plus additional iterations of the frequency offset to complete the frequency hopping pattern, wherein each of the frequency hop resources is repeated in the time domain for the number of time repetitions for each frequency hop.

13. The wireless device of claim 12, wherein the resources used for the downlink receptions that are repeated in time with the frequency hopping pattern are preempted by resources used for transmitting system information by the base station.

14. The wireless device of claim 11, wherein the uplink transmissions that are repeated in time with the frequency hopping pattern comprise data channel that are repeated using resources comprising:
   time domain resources starting from a starting slot and consecutively incrementing a slot number for the total number of time repetitions; and
   frequency domain resources including a first frequency hop resource, a second frequency hop resource at the first frequency hop resource plus a frequency offset, and additional frequency hop resources at the first frequency hop resource plus additional iterations of the frequency offset to complete the frequency hopping pattern, wherein each of the frequency hop resources is repeated in the time domain for the number of time repetitions for each frequency hop.

15. The wireless device of claim 11, wherein the frequency hopping pattern is a function of a number of frequency domain resources assigned to the wireless device.

16. The wireless device of claim 11, wherein the total number of time repetitions comprises at least one of 12, 16, 24, or 32.

17. The wireless device of claim 10,
   wherein the operations to receive from the base station the configuration information comprises operations to receive the configuration information from the base station when the wireless device initiates a connection request to the base station, wherein the configuration information includes time repetition parameters and frequency hopping parameters for uplink transmissions by the wireless device to complete the connection request, and
   wherein the operation to transmit the uplink transmissions comprises operations to transmit to the base station a handshaking message to complete the connection request, wherein the handshaking message is repeated in time with the frequency hopping pattern based on the time repetition parameters and the frequency hopping parameters received when the wireless device initiates the connection request.

18. The wireless device of claim 17, wherein the configuration information further includes information on a modulation and coding scheme used for by the wireless device to transmit the handshaking message.

19. A method of communicating by a base station of a wireless communication network, the method comprising:
   transmitting, by the base station to a wireless device of the communication network, configuration information used to extend a communication range of between the base station and the wireless device, the configuration information including time repetition parameters and frequency hopping parameters used for downlink transmissions and uplink receptions by the base station, wherein the time repetition parameters and frequency hopping parameters comprise a number of time repetitions for each frequency hop;
   transmitting, by the base station to the wireless device, downlink receptions that are repeated in time with a frequency hopping pattern based on the time repetition parameters and the frequency hopping parameters in the configuration information; and
   receiving, by the base station from the wireless device, uplink transmissions that are repeated in time with the frequency hopping pattern based on the time repetition parameters and the frequency hopping parameters in the configuration information.

20. The method of claim 19, wherein the time repetition parameters and frequency hopping parameters further comprise:
   a total number of time repetitions; and
   a frequency hopping pattern.

* * * * *